J. STOTT.
CONSTRUCTION OF INJECTORS.
APPLICATION FILED JULY 9, 1918.
1,323,116.
Patented Nov. 25, 1919.
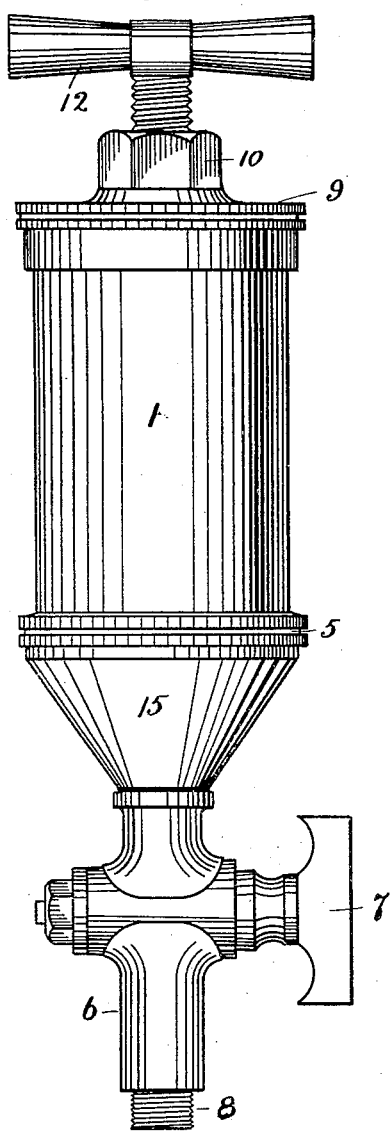
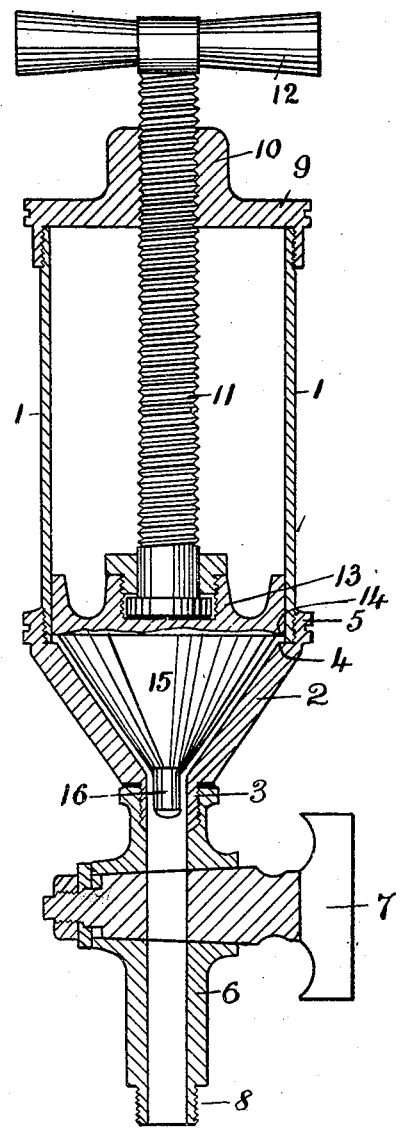

UNITED STATES PATENT OFFICE.

JAMES STOTT, OF CONWAY, WALES.

CONSTRUCTION OF INJECTORS.

1,323,116.  Specification of Letters Patent.  Patented Nov. 25, 1919.

Application filed July 9, 1918. Serial No. 244,097.

*To all whom it may concern:*

Be it known that I, JAMES STOTT, a subject of the King of Great Britain, residing at Conway, North Wales, have invented certain new and useful Improvements in Construction of Injectors, of which the following is a specification.

The object of this invention is to construct an injector or filler principally for use in filling the pads of rupture trusses constructed in accordance with the invention set forth in my United States of America Patent No. 1194252, dated August 8th, 1916, and whereby the injector or filler proper may clean itself of the quick setting material at each operation.

My invention will be clearly understood from the following description aided by the annexed drawings in which—

Figure 1 is an elevation of a complete appliance.

Fig. 2 is a longitudinal section of same.

For the purpose of my invention I construct my injector or filler from a cylinder 1 having an outer screw thread cut at each end. To one end I fit a conical nozzle 2 having at its apex an exteriorly screw threaded hollow extension 3, the interior of the nozzle 2 being cone shaped having a flat shoulder 4 between it and the screw threaded portion 5 by which it is attached to the cylinder. To the screwed extension 3 I screw a tube 6 provided with a plug tap 7 and having at its opposite end an exterior screw thread 8, the bore of the tube 6 and the plug of the tap being the same right through.

To the other end of the cylinder 1 I screw a cap 9 having a screw threaded extension 10 at the center thereof such cap 9 fitting the edges of the cylinder tightly.

Through this screw threaded extension 10 of the cap I pass a screw threaded rod 11 one end of which is provided with a handle 12 while the other end has a piston 13 (fitted or not with piston rings or packing) gimbaled thereto such piston being within the cylinder and having a close fit with the walls thereof.

The front end of the piston 13 is provided with a shoulder 14 and a coned portion 15 the cone 15 terminating at its apex in a short stem 16 such shoulder 14, cone 15 and stem 16 corresponding with the shoulder cone and hollow extension of the conical nozzle 2 on the end of the cylinder 1 so that when the piston 13 is moved fully home the walls and cones fit each other and insure a full ejection of any material from the cylinder through the space between the stem 16 and the extension 3.

The *modus operandi* is to fill the cylinder 1 with a quick setting material screw the stem 6 by the screwed end 8 on to the pad to be filled such pad being shown at Fig. 6 of my previously recited patent and turn the screw rod 11. This projects the piston 13 and forces the material into the pad and when the pad has become sufficiently filled the tap 7 is turned off and the cylinder 1 with its nozzle 2 is unscrewed from the valved stem 6 which is left on the pad long enough for the material in the pad to set and when that is done the valved stem 6 is removed.

Should any material remain in the cylinder or cone nozzle the piston 13 is moved fully home and is completely ejected therefrom and the bore of the stem and valve being the same any material remaining therein can easily be ejected by pushing a rod through the bore, and any material remaining in the space between the hollow extension 3 and the stem 16 can easily be removed.

What I do claim as my invention, and desire to secure by Letters Patent, is:—

An injector or filler for use with a quick-setting material comprising a cylinder, a cone-shaped cover removably applied to one end of the cylinder and having an exteriorly screw-threaded cylindrical extension at its reduced end, the enlarged end of the cover adjacent to the end of the cylinder being formed with an annular shoulder, a hollow stem carrying the valve secured to the extension of the cover and having a bore therein of the same diameter as the interior of the said extension, a cover at the opposite end of the cylinder having a central screw-threaded opening therethrough, a piston within the cylinder having a shoulder to abut against that of the cover and also provided with a cone-shaped extension of less dimensions than the interior of the cone-shaped cover and terminating in a straight stem adapted to project into the extension of the cone-shaped cover and of less diameter than the interior of said extension, and
5 a screw rod connected to the piston and adjustably passing through the cover having the central screw-threaded opening therein.

In testimony whereof I have hereunto set my hand in presence of two subscribing witnesses.

JAMES STOTT.

Witnesses:
 FRED. C. JONES,
 ANNIE JONES ROBERTS.